9096X
E. Badlam, Jr.
Boring Hubs.
Patented Sep. 18, 1835.
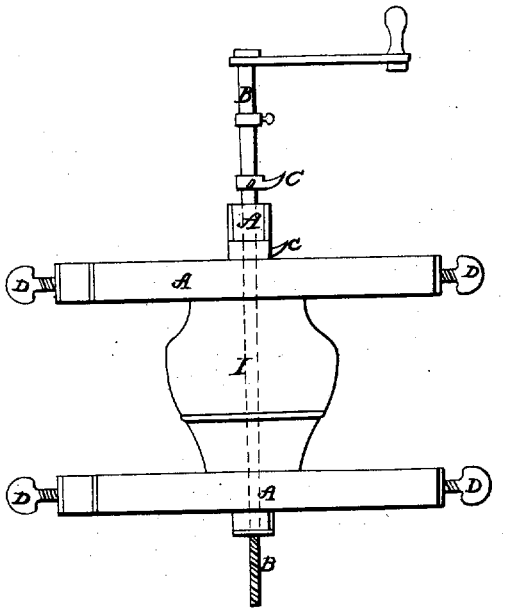
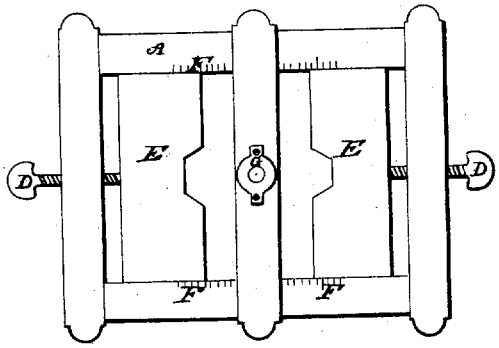
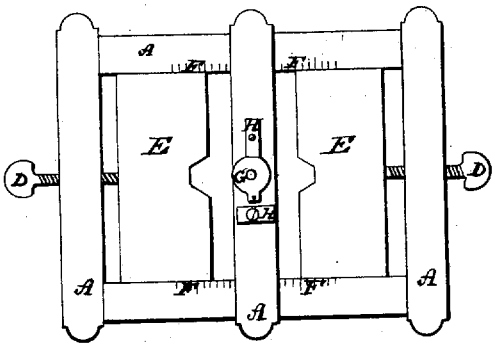
AM. PHOTO-LITHO. CO. N.Y. (OSBORNE'S PROCESS)

9096X Sept. 18. 1835 317.

Edward Badlam Jr. of Chester, Vermont:
Letters Patent.

The schedule referred to in these Letters Patent and making part of the same containing a description in the words of the said Edward Badlam Jr. himself, of his improvement in the Box Setter for boring out and fitting all kinds of common and pike boxes in hubs &c.

---

To all to whom these presents shall come: Be it known that I, Edward Badlam Jun. of Chester, in the County of Windsor, and State of Vermont, have invented a new and useful improvement in the Box Setter, for boring out and fitting all kinds of common and pike boxes in hubs &c. and that the following is a full and exact description of my said improvement. The box setter is constructed as follows viz: make two square frames with slides in which are placed dies to receive hubs of all sizes, these dies are regulated by means of screws which screw through each end of the frames and press against the back of each die. on the side of each of the frames there is a scale of inches and eights of inches for the purpose of regulating the distance of the dies from the center of each of the frames. These frames are placed one on each end of a hub and whatever may be the diameter of the hub to be operated upon the dies are so shaped as to fit it and the scale on the side of each frame will designate when the centre of the hub is in the centre of the frame. On the top of one of the frames there is fixed a cross piece which is raised from the surface of the frame about two inches having a hole with a metallic box to receive a shaft to be hereafter described, and on the surface of the other frame, there is also a cross piece made fast to it, in the middle of which is a metallic nut let into it and kept into its place by means of two buttons for the convenience of removing. The shaft above mentioned is made of iron, perfectly cylindrical with a crank at one end, and a screw at the other; said screw to be of less diameter than the other part of the shaft, and made to work in the nut above described. Three mortises are cut through the shaft about two or three inches apart in which are inserted cutters for setting all kinds of common or pike boxes. The set of the cutters is affected by means of thumb screws. a washer is let on to the shaft 9096x above the upper cutter for the purposes of regulating the depth of the cut in the hub, it can be set at any point by means of a thumb screw.

Operation. The frames are secured one to each end of the hub, in the manner above described. The shaft is passed through the hole in the metallic box the cutters set in between the cross pieces and the surface of the frames thereby turning the crank the screw on the end of the shaft works into the nut on the cross piece of the other frame and enables the cutters to perform their operation. When the lower cutter has nearly gone through the hub, the nut is removed and the operation continued until the washer has reached the surface of the metallic box.

What I claim as new, as my improvement, and for which I solicit Letters Patent, is the arrangement of the slides, dies, screws, and scales, for the purpose of adapting the machine to all sizes of hubs and to enable the workmen to set the hub in the centre of the frame. In testimony that the above is a true specification of my said improvement as above described I have hereunto set my hand this 5th day of September A.D. 1835.

Witnesses

Chs. M. Keller

Clement T. Coote

Edward Badlam Junr.

(Patented September 18. 1835)

Exd
H.G.C.

(Drawing)

[752.